US007310566B2

(12) United States Patent
Fröhlich

(10) Patent No.: US 7,310,566 B2
(45) Date of Patent: Dec. 18, 2007

(54) QUALITY CONTROL METHOD FOR TWO-DIMENSIONAL MATRIX CODES ON METALLIC WORKPIECES, USING AN IMAGE PROCESSING DEVICE

(75) Inventor: Konrad Fröhlich, Stuttgart (DE)

(73) Assignee: Borries Markier-Systeme GmbH (DE)

( * ) Notice: Subject to any disclaimer, the term of this patent is extended or adjusted under 35 U.S.C. 154(b) by 0 days.

(21) Appl. No.: 10/546,817

(22) PCT Filed: Nov. 6, 2003

(86) PCT No.: PCT/EP03/12405

§ 371 (c)(1),
(2), (4) Date: Aug. 25, 2005

(87) PCT Pub. No.: WO2004/076968

PCT Pub. Date: Sep. 10, 2004

(65) Prior Publication Data

US 2006/0155408 A1   Jul. 13, 2006

(30) Foreign Application Priority Data

Feb. 28, 2003   (DE) ................................ 103 08 684

(51) Int. Cl.
*G05B 11/01* (2006.01)
*G05B 13/02* (2006.01)
*G06F 19/00* (2006.01)
*G06K 9/00* (2006.01)

(52) U.S. Cl. ........................ 700/174; 700/13; 700/51; 700/114; 700/160; 700/186; 700/193; 382/108; 382/152; 702/81

(58) Field of Classification Search .................. 700/13, 700/51, 52, 54, 57–59, 64, 108–110, 114, 700/117, 124, 125, 160, 174, 175, 176, 186, 700/193, 195, 302; 382/114, 141, 152, 167, 382/108; 702/81–84, 179
See application file for complete search history.

(56) References Cited

U.S. PATENT DOCUMENTS

| 4,072,928 | A  | * | 2/1978 | Wilder ........................ 382/152 |
| 5,956,253 | A  | * | 9/1999 | Gottschalk .................. 700/186 |
| 6,243,618 | B1 | * | 6/2001 | Miyazaki et al. ........... 700/125 |

FOREIGN PATENT DOCUMENTS

DE   19930272   *   1/2001

\* cited by examiner

*Primary Examiner*—Leo Picard
*Assistant Examiner*—Sean Shechtman
(74) *Attorney, Agent, or Firm*—Bacon & Thomas, PLLC

(57) ABSTRACT

A quality control method for two-dimensional matrix codes on metallic workpieces, the codes being in the form of stamped marking dots is disclosed. The stamping process for the marking dots is carried out by a marking tool (17) with the aid of predetermined digital positional data. The corresponding image data is then recorded for analysis by an image processing device (22), exclusively at the locations that have been predetermined by the positional data, or additional image data that has been previously generated is also used for the analysis, to establish whether a correct marking dot with the required quality characteristics is present.

12 Claims, 2 Drawing Sheets

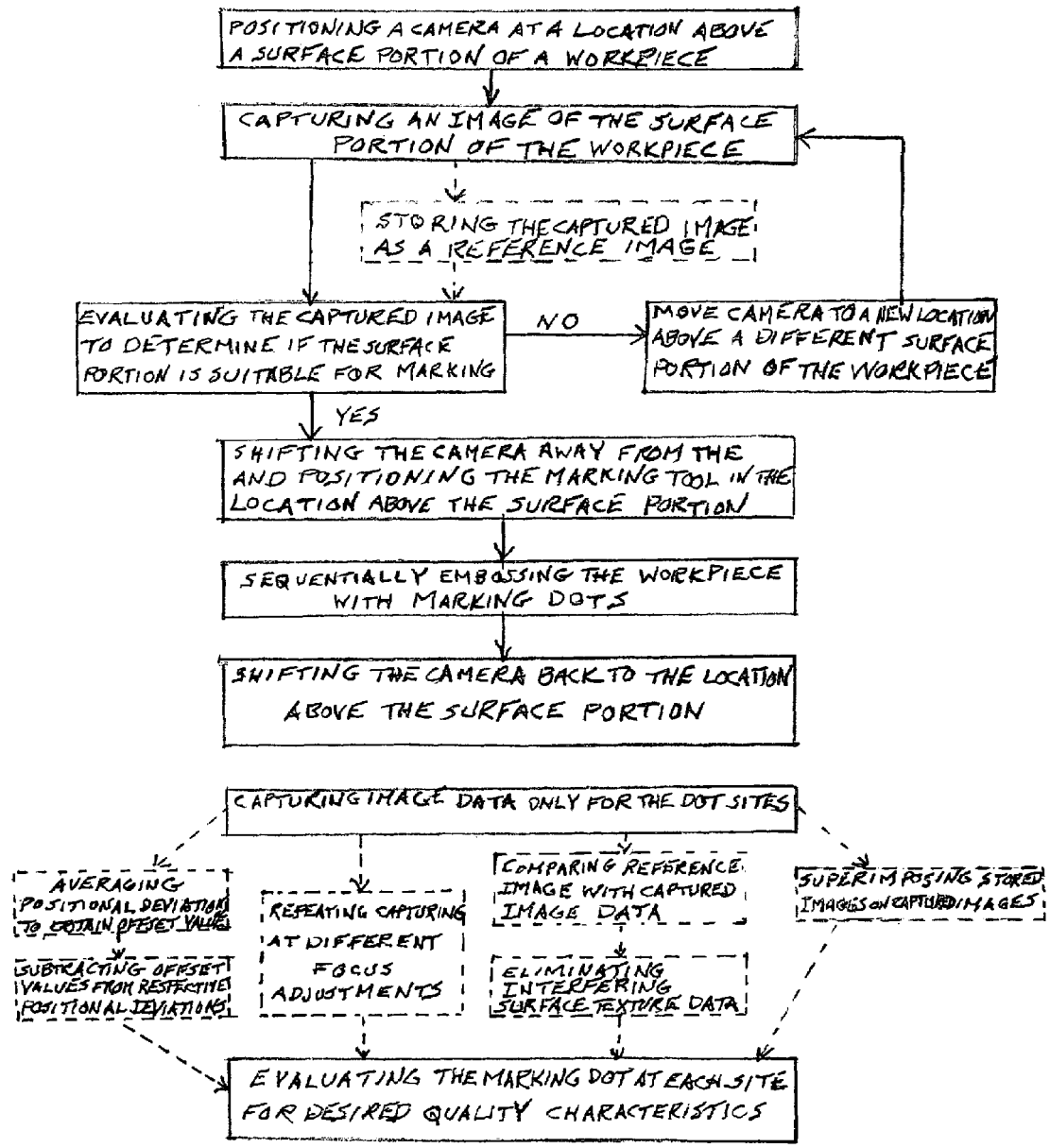

QUALITY CONTROL METHOD FOR TWO-DIMENSIONAL MATRIX CODES ON METALLIC WORKPIECES, USING AN IMAGE PROCESSING DEVICE

BACKGROUND OF THE INVENTION

1. Field of the Invention

The invention refers to a method for quality control for two-dimensional matrix codes on metallic workpieces, which are present in the form of embossed marking dots, with an image processing device.

2. The Related Art

The marking dots of such a two-dimensional matrix code are normally embossed by means of a hard-metal needle of a marking tool. This is done on one hand very fast and on the other hand in a very narrow arrangement, wherein such matrix areas can be very small and possess a length and width of only a few millimeters. For being able to read back the information of the matrix code without any errors, the precision in placing the marking dots is of high importance, with the exact shape, size, position and depth of the marking dots being important quality features. It is therefore very critical to check, during or after the production of such a matrix code, whether the information can be read back without any errors, i.e. whether the marking dots are present in the correct place in the necessary quality.

Known methods for the quality control of two-dimensional matrix codes use a "finder function" like the one which is used at reading for the position determination of the code array. The square matrix codes have two adjacent outlines with marking dots in narrow sequence. These two outlines are searched in the image data collected by a camera as an image processing device for determining the position of the matrix code in this manner. The two other outlines have marking dots whose distance corresponds, respectively, to the distance of the grid lines of a grid possessing the marking dots as grid points. Thus, these grid points are determined from the image data and, subsequently, the calculated points are checked as to whether a marking dot of the desired quality is positioned there. Due to image capture, image processing and subsequent calculation, multiple error factors are included in quality control which render the entire process very imprecise, in particular in case of very small distances between the dots.

SUMMARY OF THE INVENTION

Accordingly, an object of the present invention is provision of a method for fast, easy and precise quality control for two-dimensional matrix codes.

This objective is accomplished, according to the invention, by the embossing process for the marking dots taking place based on preset digital position data, using a marking tool, and by the subsequent capturing of the corresponding image data by means of the image processing device, only at the sites precisely predetermined by the position data, for checking whether at each site there is a correct marking dot with the desired quality characteristics.

The advantages of the method according to the invention lie in particular in the fact that the known finder function can be omitted and is replaced by a much more precise method for finding the marking dots and checking the same. According to the invention, the position data for the marking tool, which are preset anyway, are supplied to the image processing device so that it possesses the exact coordinates of the marking dots even without image capture. The quality check then needs only to be performed at these coordinate points. All errors of the known methods, which are related to determination of the coordinate positions, are therefore almost completely eliminated so that the quality check of the marking dots can be performed with much higher precision.

For checking the desired quality characteristics of the respective marking dots, one or more of the following parameters are detected and compared with default data: area, depth, length, width, area midpoint or centroid, ellipticity. This check takes place by means of the image information recorded at the coordinate sites. During this process, deviations from the default data can be documented or even evaluation criteria given.

To compensate for any still existing small position offset, the average of the positional deviations of all marking dots, respectively, is subtracted as an offset value. This is because such a position offset does not contain any quality deviation of the code to be tested, but only the imprecision of the positional relation used by the image processing device or camera on the one hand and the marking tool on the other hand.

An advantageous measure for achieving high-grade quality control consists in the fact that before a matrix code is applied, a reference image of the corresponding surface portion of the workpiece is recorded and stored and/or evaluated. If the surface portion is recognized as being too bad, e.g. having a surface texture which is too rough or severe defects, such as blow holes or mechanical damages, a shift to a different, better surface portion takes place which is, of course, also checked first. In this manner, a marking which can not be used can be avoided in the first place.

Another advantage of recording a reference image of the material surface before applying a matrix code consists in the fact that a correlation between the reference image and the corresponding image data after application of the matrix code is performed to eliminate interfering surface texture data. By such a correlation of the reference image with the image to be analyzed, differences between the actual physical-geometrical properties of a marking dot and its optical representation by the camera in the form of pixel patterns are reduced and omitted from the evaluation of the coding to be evaluated. These differences can also be due to illumination, optics, CCD sensor and signal filtering.

Another advantageous method for improving quality control consists in recording the image data with different focus adjustments, in particular in recording them at varying distances between camera and workpiece surface and correlating them. Interferences of various kinds can be filtered more easily in this manner.

Another advantageous measure for improving the quality control consists in using an individual marking dot, previously recorded in a real manner as an image, electronically in an "artificial" image which is generated by superimposing this "reference image" of a marking dot at all preset target positions of marking dots of the code image to be measured currently. This "reference image" of a marking dot may have been generated and be used in respect to various characteristics with different qualities. As an alternative, this "reference image" may have been generated by statistical averaging of many marking dots really generated.

Advantageously, the marking tool and the image processing device can be moved in mechanical coupling with each other. In this manner, a tolerance-free alternative positioning of the image processing device or camera, respectively, on the one hand and of the marking tool on the other hand above the marking position of the workpiece is possible by moving both with the same three-axis carriage system. Tolerance-free positioning, also in the z axis, allows an imaging which is true to scale and, therefore, a size measurement which can be calibrated as well.

BRIEF DESCRIPTION OF THE DRAWING

FIG. 2 is a flow chart of a preferred embodiment of the method of the present invention.

DESCRIPTION OF THE PREFERRED EMBODIMENTS

Figure 1:
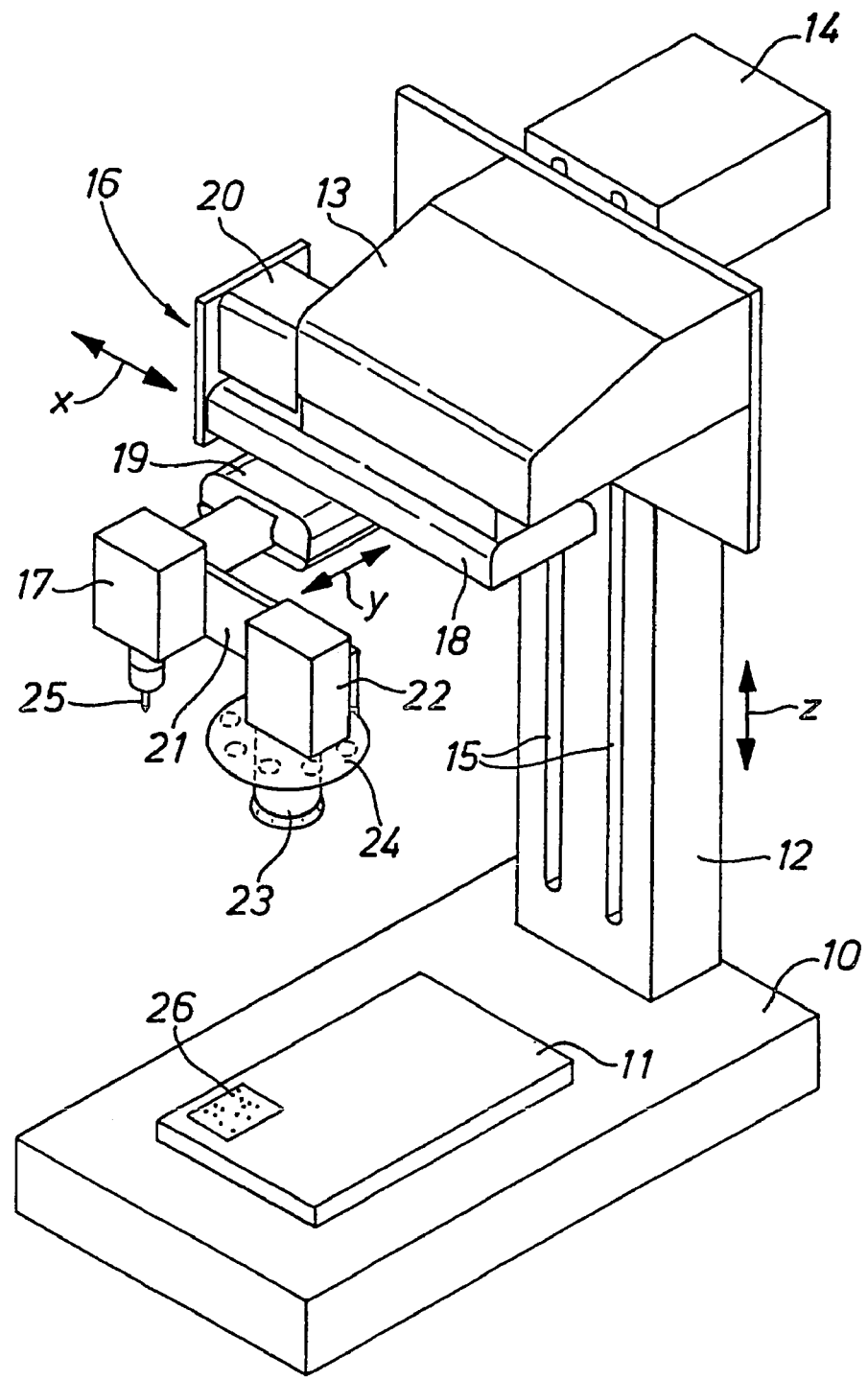
FIG. 1 is a perspective view of a marking tool attached to an adjustable support and firmly connected to a camera, used in practice of a preferred embodiment of the present invention.

FIG. 1 shows a supporting table 10 for taking up metallic workpieces 11 to be provided with a two-dimensional matrix code, as including a column 12 arranged on which is mounted a holder 13 which can be vertically moved and positioned by means of a motor drive 14. For guidance on the column 12 during movement in the vertical direction z, guide slots 15 are used.

On the holder 13, a carriage arrangement 16 is arranged through which a marking tool 17 can be driven and positioned in the two horizontal axes (x axis and y axis). The carriage arrangement 16 consists of an x-carriage 18 for the direction x and a y-carriage 19 for the direction y. Each of the carriages 18 and 19 is equipped with motor positioning drives, with only the positioning drive 20 for the x-carriage 18 being recognizable in the perspective drawing.

By means of a spacing element 21, the marking tool 17 is firmly connected to an image processing device devised as a camera 22 which can be implemented e.g. as a CCD camera. Around the lens 23 of the camera 22, an illumination device 24 is arranged for illuminating the matrix area as well as possible. Naturally, the illumination device 24 can also be arranged in a different position on the camera 22 and/or the marking tool 17.

The marking tool 17 possesses a striking tool devised e.g. as a hard-metal needle 25 which, after suitable positioning, executes striking movements against the workpiece 11 for creating the marking dots executed as striking recesses. A multiplicity of such marking dots then forms a two-dimensional matrix code 26, with the presence or lack of the marking dots at the respective grid points representing the binary encoded information. During this process, the motor drive 14 for the holder 13 and the carriage arrangement 16 are used for positioning the marking tool 17 above the site to be encoded on the metallic workpiece 11.

Before the marking process starts, the camera 22 is positioned above the site to be encoded and captures a reference image signal of the area to be encoded. Based on this reference image signal, an evaluation of the surface texture can take place, e.g. gray-scale value distribution and variance. By means of a threshold evaluation, it can be tested whether the site intended for marking is at all suitable for this purpose or whether e.g. the surface roughness is too great or severe defects, such as blow holes etc., are present, or whether this area shows substantial mechanical damages making it unsuitable for code marking. If the evaluation indicates that the envisaged site is not suitable for marking for the reasons stated above, a better marking site more free from interference is searched by moving the carriage arrangement 16. The found site is then taken into account or accepted, respectively, in the marking control with its offset values.

Subsequently, the marking tool 17 is shifted by means of the x-carriage 18 over a distance corresponding precisely to the distance between the lens 23 of the camera 22 and the hard-metal needle 25. In this manner, the marking tool is positioned exactly where the camera 22 was positioned before. Now, by a sequence of striking movements of the hard-metal needle 25 and movements of the carriage arrangement 16, the matrix code 26 is generated. The positions of the individual matrix points are preset by means of stored digital position data.

Subsequently, the camera 22 is driven back into its original position by movement of the x-carriage 18, i.e. in a position above the now existing matrix code 26. The camera now records a test image signal. By correlation with the reference image signal which has already been recorded and stored, e.g. the surface texture of the metallic workpiece 11, which interferes with the quality check for the marking dots, can be masked out. This means de facto a masking of any interference signals due to the surface texture which would falsify the image point information to be evaluated for the marking dots. Other disturbing influences for the quality check can be caused by the illumination, the optics, the camera or signal filtering. These influences can be eliminated by such a correlation as well.

Now the actual quality check of the marking dots at the sites indicated by the stored coordinates takes place. These coordinates are basically the same as those controlling the marking process of the marking tool. The quality check can be performed in different ways and with different amounts of effort. Quality criteria are e.g. the area, the length, the width, the ellipticity, the depth, the area midpoint and centroid of the marking dots. At the position data, the corresponding image data of the marking dots are recorded and compared with stored default values. A quality check is performed according to detected deviations. This can be reproduced in detail or, in the simplest case, exceeding of maximum permissible deviations leads to optical and/or acoustic alarms.

For compensation of any existing position offset, i.e. a homogeneous displacement of all x and y values by a certain amount, the average of all positional deviations is determined as an offset value and a corresponding correction is performed. Such an offset does not represent any quality deviation of the marking dots to be checked, but only an imprecision of the employed positional relation of camera 22 and marking tool 17, whatever may have caused this imprecision.

As a variation of the presented embodiment, the linear movement described can also be replaced by a swinging movement for the reciprocal positioning of the marking tool 17 and the camera 22. For instance, a swivel axis could be arranged on center between the marking tool 17 and the camera 22 so that the change in position can be performed respectively by a 180° swinging movement. In a simpler embodiment, the movement of the camera 22 can be uncoupled from the marking tool 17 as well and, for instance, the camera can be firmly marked or have an independent drive. Since this makes the recording position of the camera deviate from that of the marking tool, this must be taken into account during conversion of the position data for the marking dots. Also the tolerance-free positioning possible during synchronous movement and representation to scale must accordingly be compensated for electronically as well.

In the described embodiment, image processing for quality control is combined with the production machine, i.e. with the marking tool. The purpose is mainly to guarantee the quality of the generated matrix codes such that they can be read perfectly by reading devices during later use. In principle, the method according to the invention can also be carried out independently of a marking tool.

In a simpler embodiment, the recording of a reference image signal and the comparison with the test image signal can also be omitted, in particular if workpieces, which have none or only a minimum surface texture, are to be provided with a matrix code 26.

The invention claimed is:

1. A method for quality control of two-dimensional matrix codes on a metallic workpiece with an image processing device, wherein said metallic workpiece is to be embossed with two-dimensional matrix codes in the form of embossed marking dots, the method comprising:

positioning the image processing device at a location above a surface portion of the metallic workpiece, said surface portion to be embossed at sites based on preset digital position data, each site being defined by coordinates as a position for a single one of said embossed marking dots;

shifting the image processing device from said location and positioning a marking tool in said location;

subsequently embossing the metallic workpiece to form the marking dots, based on the preset digital position data, using the marking tool;

subsequently, by means of the image processing device, capturing image data, only for the sites;

after capturing the image data, shifting the image processing device back to said location; and evaluating, based on the captured image data, whether or not at each site there is a marking dot with desired quality characteristics.

2. A method according to claim 1, wherein the desired quality characteristics of the embossed marking dots are evaluated against statistical characteristics by detecting, comparing with default data and/or classifying and/or monitoring as a trend, at least one parameter selected from the following parameters: area, depth, length, width, position of area midpoint or centroid, ellipticity, wherein said statistical characteristics are derived from the at least one parameter and include an average value of the at least one parameter, standard deviation of the at least one parameter, and type of distribution or class frequency of the at least one parameter.

3. A method according to claim 1 further comprising:

averaging positional deviations for all marking dots to obtain an offset value; and compensating for a possible position offset by subtracting the offset value from the respective positional deviations.

4. A method according to claim 1 further comprising, prior to said embossing, recording and/or evaluating a reference image of the surface portion the metallic workpiece.

5. A method according to claim 4, wherein, responsive to recognition of a surface portion within a reference image as bad, shifting the image processing device to a different location, above a different surface portion of the metallic workpiece.

6. A method according to claim 4 further comprising comparing the reference image and the corresponding image data captured after embossing, to eliminate interfering surface texture data.

7. A method according to claim 1 wherein image data is recorded at different focus adjustments and correlated.

8. A method according to claim 1 wherein said evaluating of the captured image data includes correlation with a reference pattern by superimposing an individual image of an individual marking dot, previously obtained in system calibration by the image processing device, on an image corresponding to the captured image data, for each site.

9. A method according to claim 8, wherein the superimposed individual image is an actual image of an actual marking dot, which actual image has previously been classified with respect to one or more specific characteristics or an image which was obtained by statistical averaging, for a multiplicity of marking dots, with the respective quality characteristics.

10. A method according to claim 1 wherein the marking tool and the image processing device are moved mechanically coupled to each other.

11. A method according to claim 5 further comprising comparing the reference image and the corresponding image data captured after embossing, to eliminate interfering surface texture data.

12. A method for quality control of a two-dimensional matrix code on a metallic workpiece with an image processing device, wherein said metallic workpiece is to be embossed with a two-dimensional matrix code in the form of embossed marking dots, the method comprising:

positioning the image processing device in an original position above a surface portion of the metallic workpiece, said surface portion to be embossed at sites defined by preset digital position data;

recording and/or evaluating a reference image of the surface portion of the metallic workpiece;

responsive to recognition of a surface portion within a reference image as bad, shifting the sites for embossing to a different surface portion, and selecting the different surface portion as the original position and adjusting the preset digital position data;

shifting the image processing device from the original position and positioning a marking tool in the original position;

embossing the metallic workpiece to form the embossed marking dots, based on the adjusted preset digital position data, using the marking tool;

shifting the image processing device back to the original position, and subsequently, by means of the image processing device, capturing image data only for the sites defined by the adjusted preset digital position data; and evaluating, based on the captured image data, whether or not the embossed marking dots at the sites have desired quality characteristics.

* * * * *